United States Patent [19]

Lou

[11] Patent Number: 5,699,217
[45] Date of Patent: Dec. 16, 1997

[54] WRITE ENABLING DEVICE AND METHOD OF USE

[76] Inventor: Eddie Y.S. Lou, 1334 Camerons St., Rowland Heights, Calif. 91748

[21] Appl. No.: 461,709

[22] Filed: Jun. 6, 1995

[51] Int. Cl.$^6$ .................................................. G11B 23/02
[52] U.S. Cl. .................................................................. 360/132
[58] Field of Search ........................................ 360/132, 133, 360/60

[56] References Cited

U.S. PATENT DOCUMENTS

| | | | |
|---|---|---|---|
| 4,549,240 | 10/1985 | Hodges | 360/133 |
| 4,685,017 | 8/1987 | Swinburne et al. | 360/133 |
| 4,796,138 | 1/1989 | Ono | 360/133 |
| 5,121,279 | 6/1992 | Saeki et al. | 360/133 |
| 5,210,671 | 5/1993 | Blackstone | 360/133 |
| 5,418,672 | 5/1995 | Tischler | 360/133 |
| 5,539,600 | 7/1996 | Lee et al. | 360/133 |

*Primary Examiner*—Stuart S. Levy
*Assistant Examiner*—Allen Cao
*Attorney, Agent, or Firm*—Tim T. Tyson

[57] ABSTRACT

A write enabling device 30 includes a hexahedron-shaped plug 32 fabricated from resilient material such as polyethylene. The plug 32 is sized to be snugly accepted by the write protect detection cavity 102 of a tape cassette. When the plug 32 is inserted into the detection cavity 102, the writing (recording) feature of the player/recorder is enabled. A flange 42 assists in the removal of an installed plug 32. Other embodiments include a second planar member 568 which may be selectively rotated to cover or uncover an aperture 562 positioned over the write protect detection cavity 102, and a cover member 668 which may be selectively slidably positioned to cover or uncover an aperture 662 positioned over the write protect detection cavity 102.

6 Claims, 8 Drawing Sheets

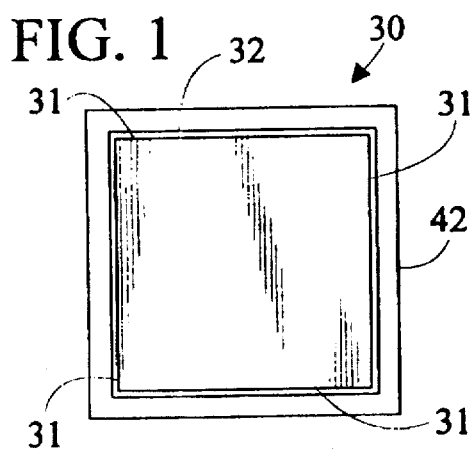
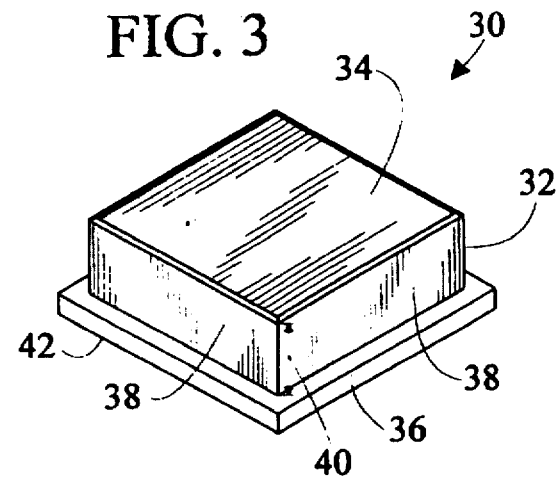
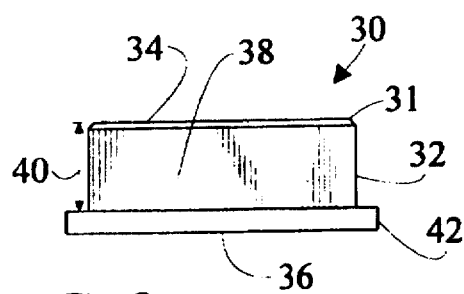
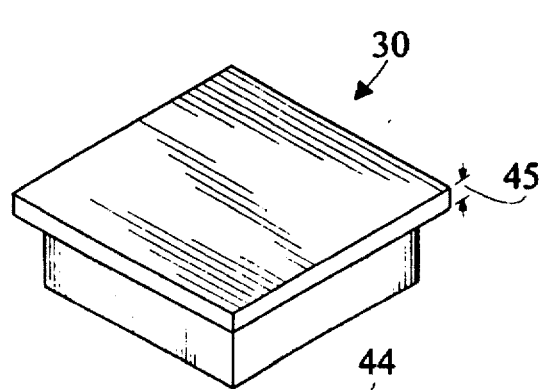
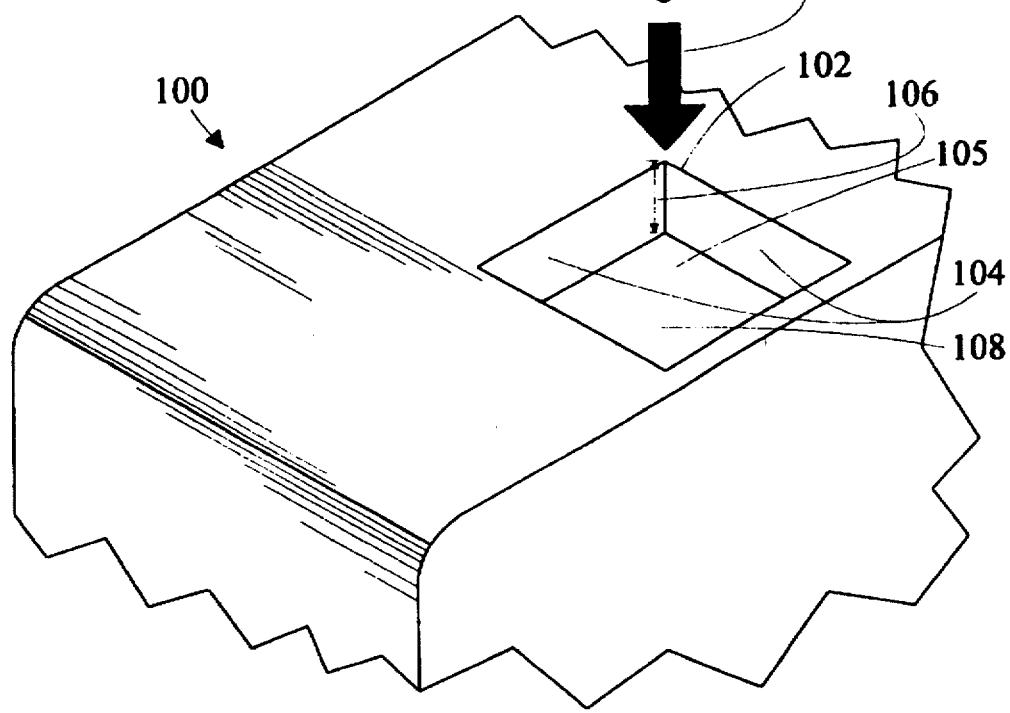

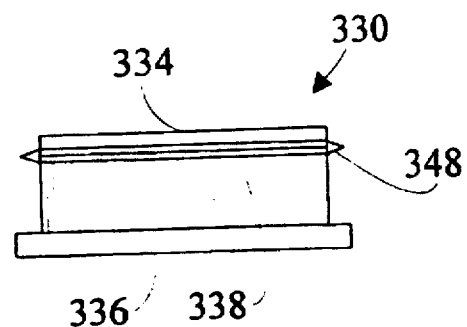
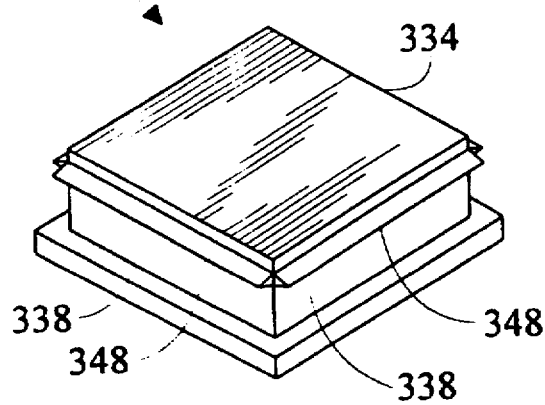
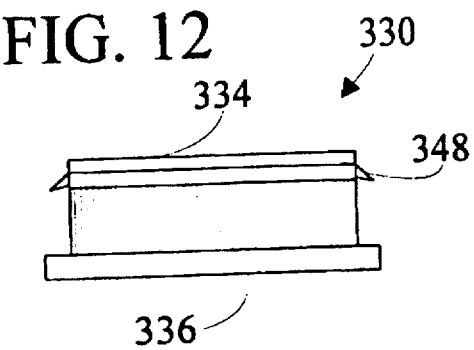
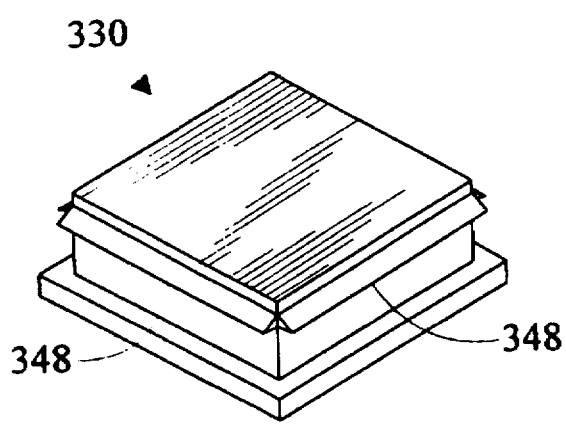
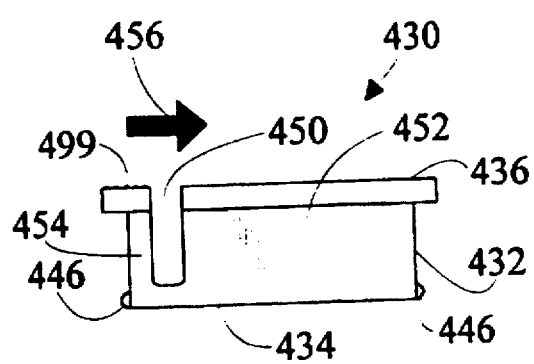
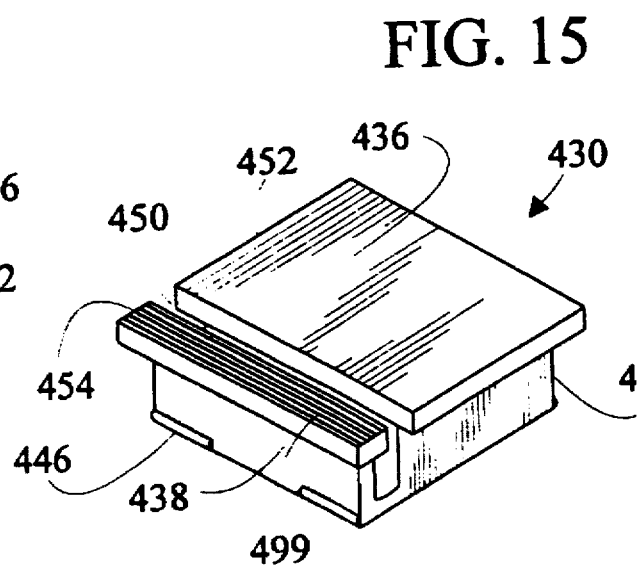

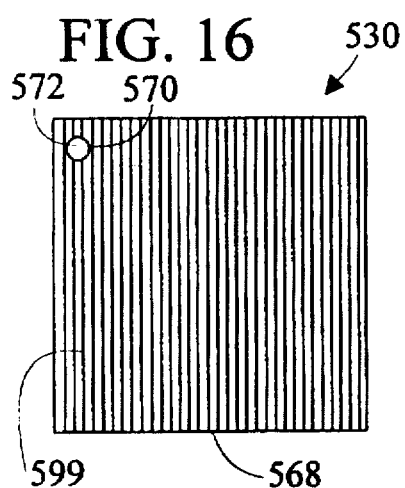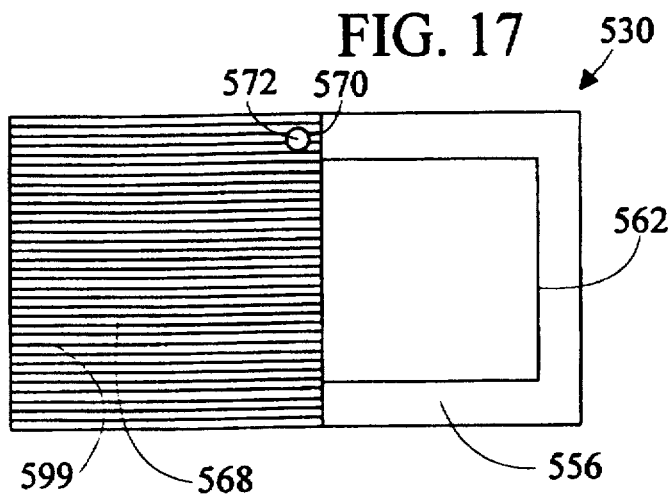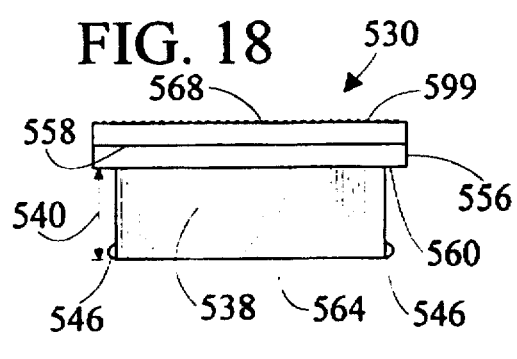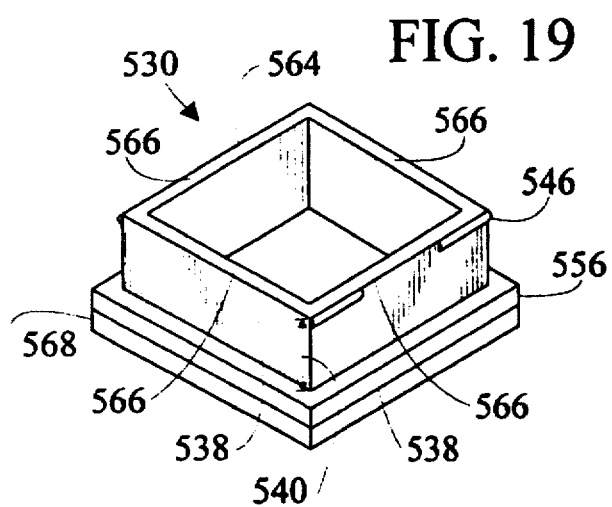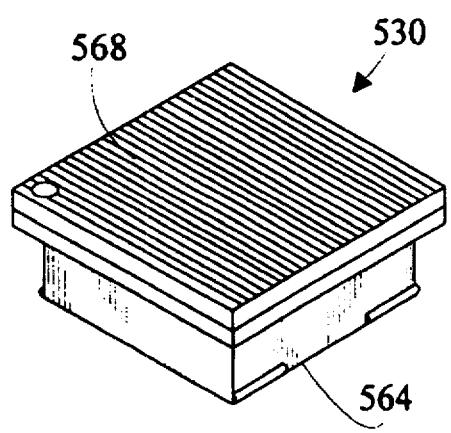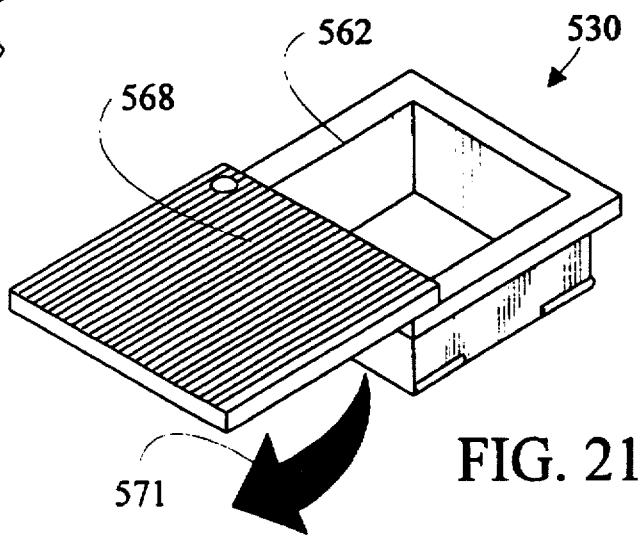

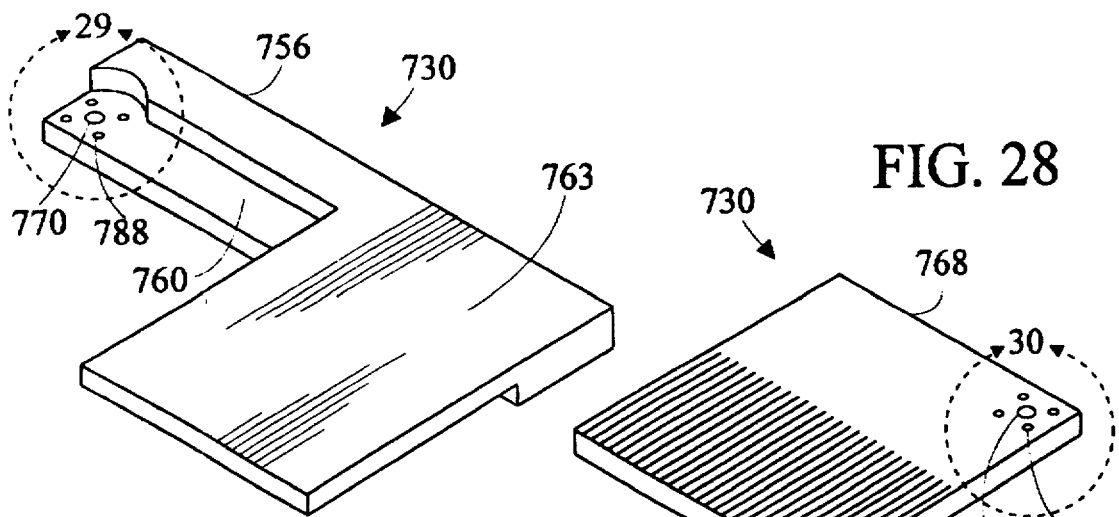
FIG. 27  FIG. 28
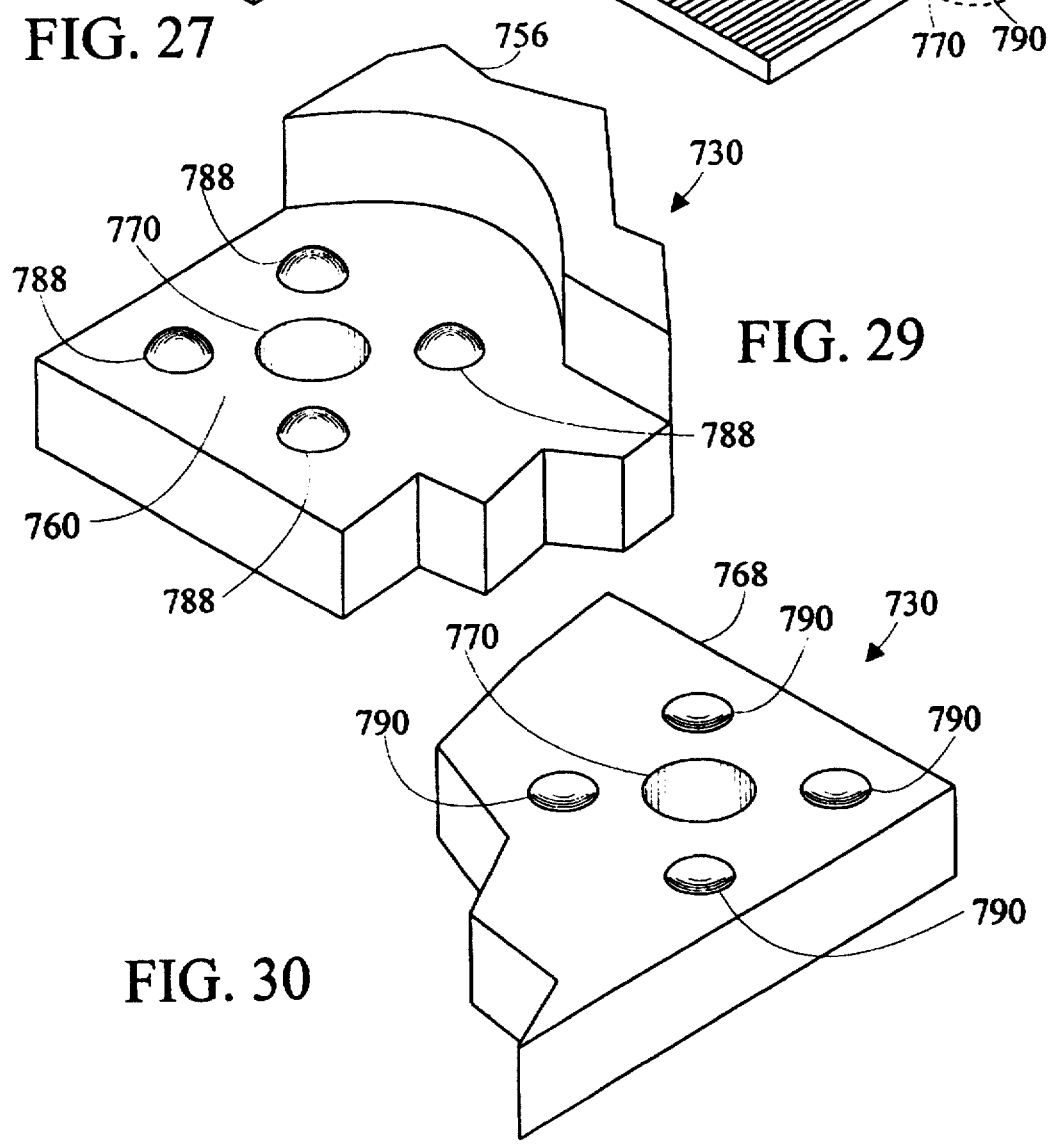
FIG. 29
FIG. 30

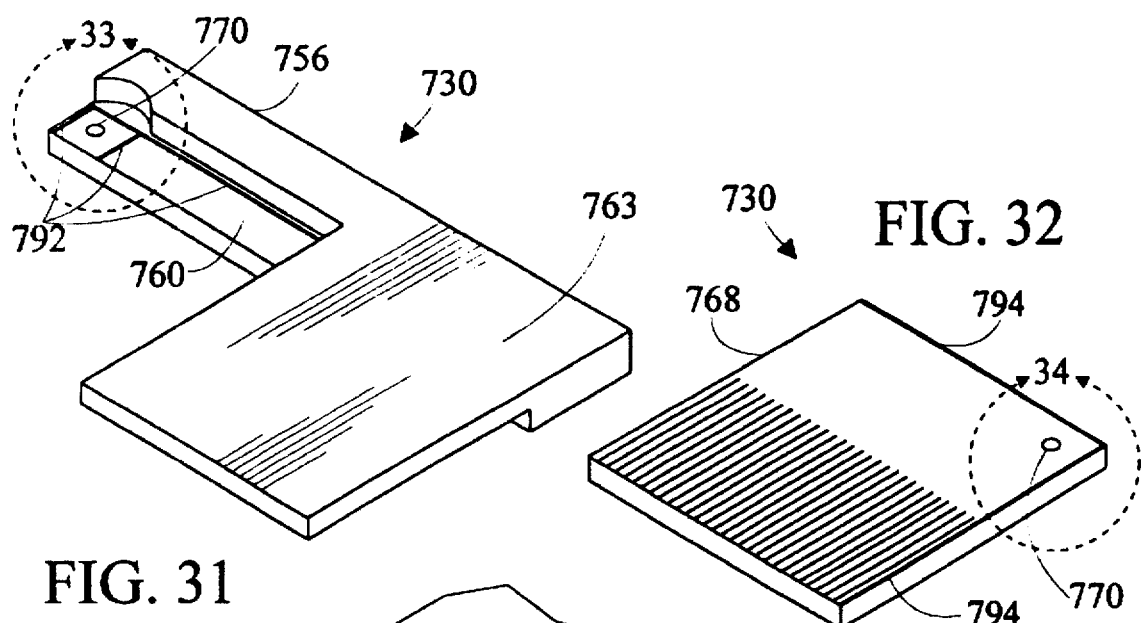
FIG. 31
FIG. 32
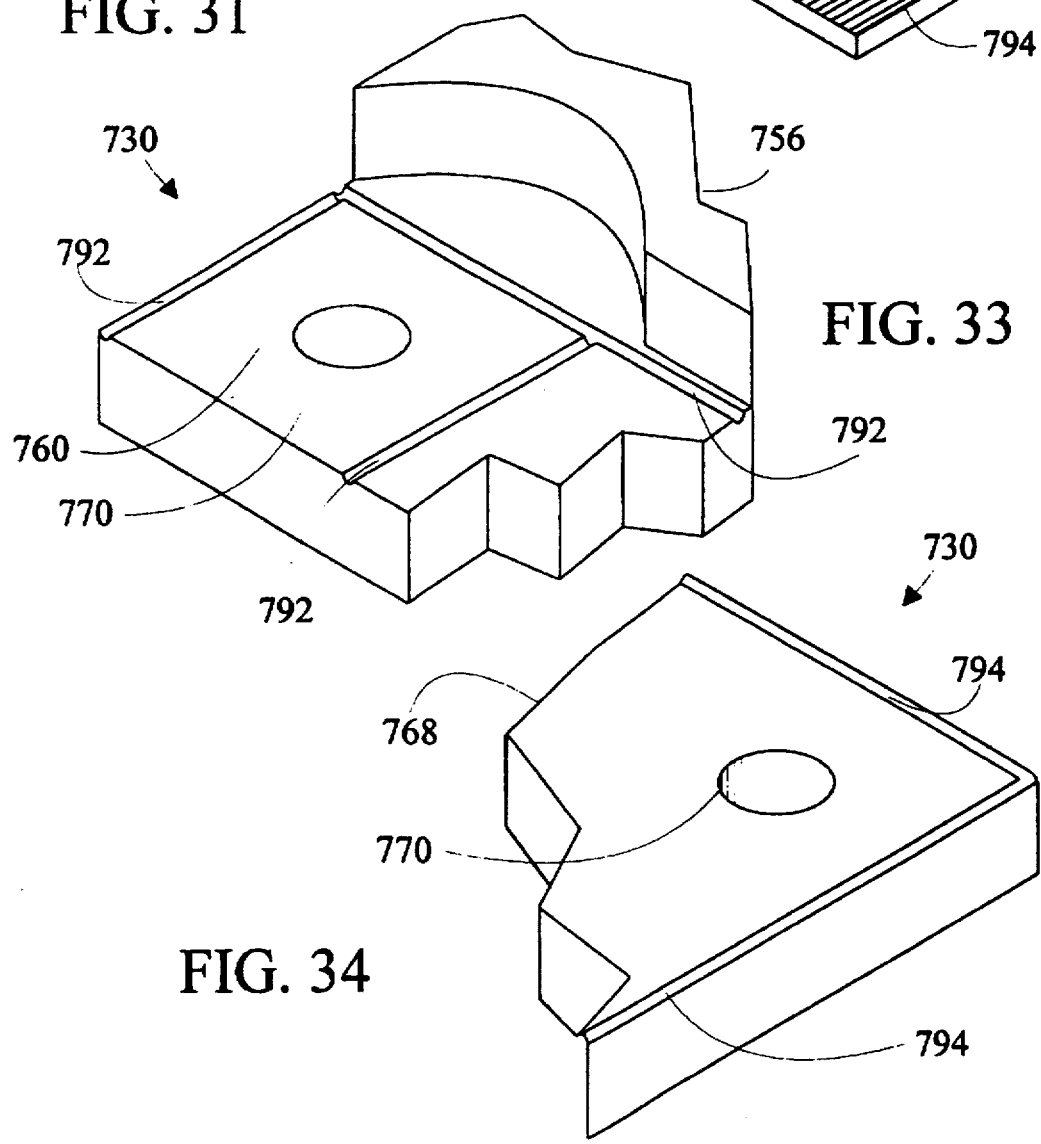
FIG. 33
FIG. 34

WRITE ENABLING DEVICE AND METHOD OF USE

TECHNICAL FIELD

The present invention pertains to a write enabling device for use with a tape cassette having a write protect detection cavity.

BACKGROUND ART

Devices for selectively enabling or disabling the write feature of cassette players/recorders have been known in the art for many years. In one common device, a break-out tab resides over a write protect detection cavity in the housing of the cassette. The break-out tab prevents a detector located in the player/recorder from entering the detection cavity and thereby permits writing or recording on the cassette. When the break-out tab is permanently removed by rupturing the connection with the housing of the cassette, the detector can enter the detection cavity and thereby prevent writing or recording. A problem exists in that once the break-out tab is removed it cannot be replaced and therefore the cassette cannot be used to record. Sometimes this irreversible feature is overcome by utilizing tape to cover the write protect detection cavity. However, oftentimes the tape does not have sufficient strength to resist the detector as it attempts to enter the cavity.

Numerous prior art devices have addressed the write enable/protect requirement in a variety of ways. For example, U.S. Pat. No. 4,348,707 shows a magnetic tape cassette for a tape recorder, having at least one erase interlock device including an actuating member movable over a defined path in the cassette between a operating position in which an opening in the housing is uncovered, and a position in which the opening is closed. U.S. Pat. No. 4,737,876 defines a magnetic record disk assembly including a floppy disk located within a rigid case having integral case stiffeners, wiping force appliers and floppy disk stabilizers. A write protect device includes a piece that is mounted to rotate through an arc of 180° in a plane perpendicular to a side surface of the case for opening and closing a sensing aperture within the case. U.S. Pat. No. 4,757,407 depicts a protective tab for floppy disks having an opening that is designed to be covered to prevent accidental erasure of any recording thereon. The protective tab has an integral clamshell construction such that it can be pried open to be positioned over the floppy disk jacket opening and snapped closed to engage the border of the floppy disk jacket and cover the opening. U.S. Pat. No. 4,771,354 discloses a write protect clip that can be permanently installed on a floppy disc and thereafter can be moved to an opened position which exposes the write protect notch of the floppy disc or to a close position which covers the notch. U.S. Pat. No. 4,796,138 comprises a write protect shutter in a magnetic disk cartridge in which the two case walls are joined by a boss around which legs of the shutter slide. The legs are formed with indentations to avoid protrusion and the joint. U.S. Pat. No. 4,805,061 describes a write protect mechanism for a computer disk cartridge having two plates. The write protect mechanism comprises a button visible through an aperture in one of the plates and slidably moveable in the aperture between a write protect position and a write enabled position. U.S. Pat. No. 4,816,954 consists of a slidable insert for blocking the disk write arm notch of diskettes used in computers. The slidable insert is pushed in one direction to block the notch, and pushed in the opposite direction to unblock the notch. U.S. Pat. No. 4,844,378 includes a magnetic tape having an improved mistake erasure preventing device. A cylindrical body is rotatably mounted in the rear corner of the body of the cassette. U.S. Pat. No. 4,860,142 shows a flexible magnetic recording medium contained in a protective jacket used for storing digital computer information. A continuously lockable shutter is inserted into the containment jacket. U.S. Pat. No. 4,875,109 defines a recording cassette having a latch that pivots between two positions. A plug at one extremity of the latch either blocks or unblocks a record/not record opening at an under wall of the cassette. U.S. Pat. No. 4,908,725 depicts an erase prevention device for use in a recording medium casing to selectively inhibit recording on a recording medium. The device comprises coaxial holes formed in the recording medium casing to provide injection passage. European Patent Application 85109223.9 discloses a plug element slidable with a reference opening of the cassette. The cassette information is derived by a sensor or positioning pin of the player/recorder which senses the plug position.

DISCLOSURE OF INVENTION

The present invention is directed to a write enabling device and method for use with a tape cassette, such as a video or audio cassette, which has a write protect detection cavity. The write enabling device has several embodiments, all of which call for the covering of the write protect detection cavity of the tape cassette with the resultant enabling of the write (record) feature of the player/recorder.

In accordance with a preferred embodiment of the invention, the write enabling device comprises a hexahedron-shaped plug fabricated from a resilient material. The plug is sized to be snugly accepted by the detection cavity in that it has faces which, when installed, exert pressure upon the walls of the detection cavity. When the plug is inserted writing is permitted (enabled). When the plug is removed writing is inhibited (disabled).

In accordance with an important aspect of the invention, the plug has a flange which assists in removing an installed write enabling device from the detection cavity.

In accordance with an important feature of the invention, the plug has a plurality of friction enhancing ridges which serve to exert additional pressure upon the walls of the detection cavity and thereby more securely retain the write enabling device in place.

In accordance with another important aspect of the invention, the faces of the write enabling device are convex.

In accordance with another important feature of the invention, longitudinal fins outwardly project from each of the faces of the write enabling device.

In accordance with another important aspect of the invention, the plug is partitioned into resiliently connected major and minor portion by a slot. When the plug is inserted in the detection cavity the major and minor portions resiliently cooperate to exert an outward force on the walls of the detection cavity.

In accordance with a preferred embodiment of the invention, the write enabling device comprises a frame integral with a first planar member having an aperture surrounded by the frame. A second planar member is rotatably connected to the first planar member so that the second planar member may be selectively rotated to cover or uncover the aperture. The frame is inserted into the detection cavity so that the aperture is aligned therewith. In a related embodiment, the first planar member is fixedly attached to the tape cassette with adhesive.

In accordance with another preferred embodiment of the invention, the write enabling device comprises a planar member having a frame and an aperture. A sliding means slidably connects the planar member to a cover member. The cover may selectively slidably cover or uncover the aperture. The frame is inserted into the detection cavity so that the aperture is aligned therewith.

In accordance with an important feature of the invention, locking means lock the cover member in either a covered or uncovered position.

In accordance with another preferred embodiment of the invention, an attachment member is rotatably connected to a cover member, and the attachment member is adhesively attached to the tape cassette. The cover member is selectively rotated to cover or uncover the write detection cavity.

In accordance with a feature of the invention, the cover member includes a plurality of parallel ridges which facilitate the covering and uncovering operation by providing a surface which can be engaged by a fingernail.

In accordance with an important aspect of the invention, a latching means retains the cover member in either the covered or uncovered position.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a top view of write enabling device in accordance with the present invention;

FIG. 2 is a side view of the write enabling device;

FIG. 3 is a perspective view of the write enabling device;

FIG. 4 is a perspective view of the write enabling device prior to insertion into the write protection detection cavity;

FIG. 10 is a side view of a fourth embodiment;

FIG. 11 is a perspective view of the fourth embodiment;

FIG. 12 is a side view of a modified fourth embodiment;

FIG. 13 is a perspective view of a modified fourth embodiment;

FIG. 14 is a side view of a fifth embodiment;

FIG. 15 is a perspective view of the fifth embodiment;

FIG. 16 is a top view of a sixth embodiment in the covered position:

FIG. 17 is a top view of the sixth embodiment in the uncovered position;

FIG. 18 is a side view of the sixth embodiment;

FIG. 19 is a bottom perspective view of the sixth embodiment;

FIG. 20 is a perspective view of the sixth embodiment in the covered position;

FIG. 21 is a perspective view of the sixth embodiment in the uncovered position;

FIG. 27 is a perspective view of the underside of the attachment member of the eighth embodiment showing a portion of a latching means;

FIG. 28 is a perspective view of the cover member of the eighth embodiment showing another portion of the latching means;

FIG. 29 is an enlarged fragmented perspective view of the area 29 of FIG. 27;

FIG. 30 is an enlarged fragmented perspective view of the area 30 of FIG. 28;

FIG. 31 is a perspective view of the underside of the attachment member of the eighth embodiment showing a portion of an alternate latching means;

FIG. 32 is a perspective view of the cover member of the eighth embodiment showing another portion of the alternate latching means;

FIG. 33 is an enlarged fragmented perspective view of the area 33 of FIG. 31; and, FIG. 34 is an enlarged fragmented perspective view of the area 34 of FIG. 32.

MODES FOR CARRYING OUT THE INVENTION

Figure 5:
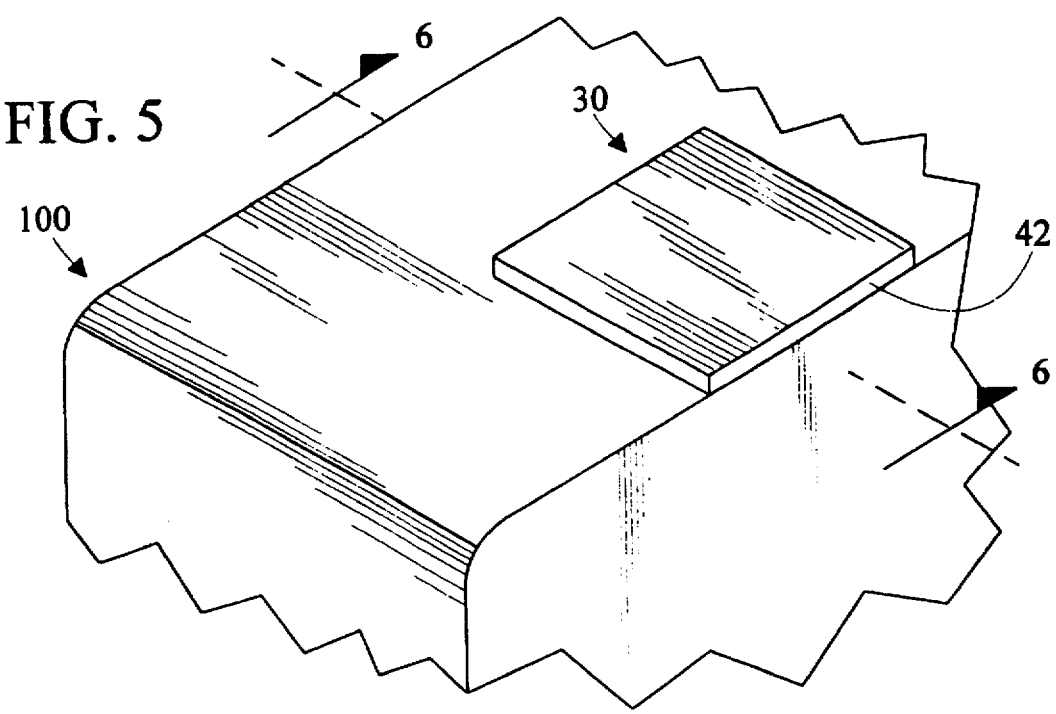
FIG. 5 is a perspective view of the write enabling device installed in the write protection detection cavity.

Referring initially to FIGS. 1, 2, and 3 there are illustrated top, side, and perspective views respectively of a write enabling device in accordance the present invention, generally designated as 30. The write enabling device 30 is designed to be used with a tape cassette 100 (refer to FIG. 4) which has a write protect detection cavity 102 formed by four walls 104 having a first depth 106 and a floor 108 that is substantially perpendicular to the walls 104. Write protect detection cavity 102 has an opening 105 which is usually square, however other shapes can also be used. Tape cassettes 100 are typically provided with a break-out tab (not shown) which initially covers the write protect detection cavity 102. In this configuration when the cassette 100 is inserted into the cassette player/recorder, a detector senses that the detection cavity 102 is covered and recording (writing) is permitted. Conversely, if the tab is removed, the detector moves into the write protect detection cavity 102 and thereby prevents recording.

The write enabling device 30 consists of a solid plug 32 which is shaped substantially in the form of a hexahedron which has substantially parallel first and second sides 34 and 36 respectively. First and second sides 34 and 36 are connected by four faces 38 each having a second depth 40 which is substantially equal to first depth 106 of the write protect detection cavity 102. Plug 32 is fabricated from a resilient material, and is sized slightly larger than the write protect detection cavity 102 so as to be snugly accepted by the cavity 102 upon insertion therein. In a preferred embodiment, edges 31 of plug 32 are tapered or beveled to facilitate the insertion process. Low density polyethylene has been found to be a useful resilient material, however numerous other polymers would also suffice. In a preferred embodiment, second side 36 extends beyond the four faces 38 thereby forming a flange 42. Flange 42 is useful in extracting an installed write enabling device 30 by providing a slightly raised portion which can readily be engaged by a fingernail or other flat object. For non-standard write protect detection cavities 102 having a depth 106 that is greater than second depth 40 (refer to FIGS. 3 and 4), flange 42 also prevents over-insertion of plug 32 into the cavity 102. The thickness 45 of flange 42 is selected so as not to interfere with the internal operation of the cassette player/recorder. In the embodiment shown plug 32 is solid, however a hollowed out plug could also be used.

FIG. 4 is a perspective view of the write enabling device 30 prior to insertion into the write protect detection cavity 102. The write enabling device 30 is inserted by pressing it into the write protect detection cavity 102 in direction 44. The resilient composition of the write enabling device 30 coupled with its slight oversize combine to retain the write enabling device 30 in the detection cavity 102.

FIG. 5 is a perspective view of the write enabling device 30 installed in the write protection detection cavity 102 (hidden) of the tape cassette 100. In the installed position, write enabling device 30 prevents the detector of the cassette player/recorder from entering the detection cavity 102 and thereby permits recording. Flange 42 assists in the removal of the write enabling device 30.

Figure 6:
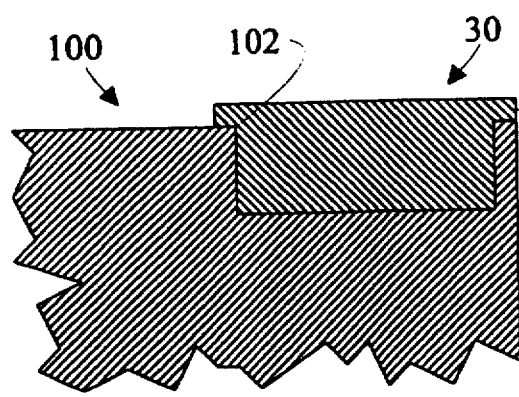
FIG. 6 is a cross section view of the write enabling device along the line 6—6 of FIG. 5.

FIG. 6 is a cross section view of the write enabling device 30 along the line 6—6 of FIG. 5. The write enabling device 30 is installed in the write protection detection cavity 102 of tape cassette 100. Flange 42 extends outwardly slightly beyond the surface of the tape cassette 100.

Figure 7:
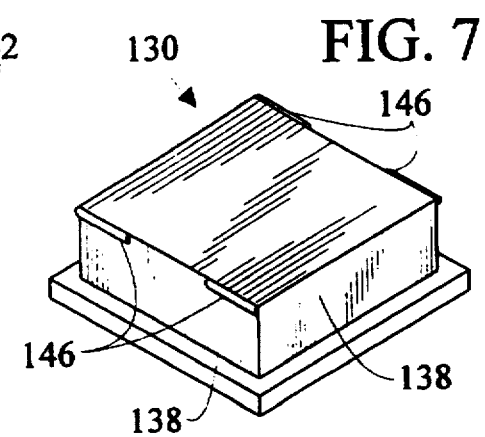
FIG. 7 is a perspective view of a second embodiment.

FIG. 7 is a perspective view of a second embodiment of the write enabling device designated as 130. In this embodiment, a plurality of friction enhancing ridges 146 are integral with at least one of the four faces 138. In the installed configuration, ridges 146 serve to exert additional pressure upon walls 104 (refer to FIG. 4) of the detection cavity 102, and thereby the write enabling device 130 is more securely retained in place.

Figure 8:
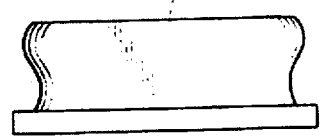
FIG. 8 is a side view of a third embodiment.
Figure 9:
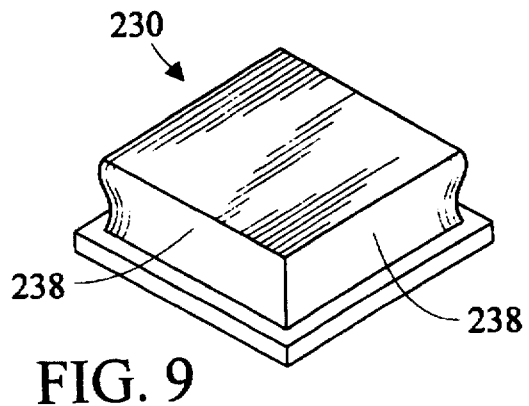
FIG. 9 is a perspective view of the third embodiment.

FIGS. 8 and 9 are side and perspective views respectively of a third embodiment of the write enabling device designated as 230. In this embodiment, the four faces 238 are convexly shaped. In the installed configuration, convex faces 238 serve to exert additional pressure upon the walls 104 (refer to FIG. 4) of the detection cavity 102, and thereby the write enabling device 230 is more securely retained in place.

FIGS. 10 and 11 are side and perspective views respectively of a fourth embodiment of the write enabling device designated as 330. In this embodiment longitudinal fins 348 outwardly project from each of the four faces 338. Fins 348 project in a direction which is substantially parallel to first and second sides 334 and 336 respectively. As the write enabling device 330 is inserted into the write protect detection cavity 102 (refer to FIG. 4), fins 348 are bent backward toward the opening 105 of the detection cavity 102. The bent fins 348 tend to resist movement in the opposite or removal direction and therefore more securely hold the write enabling device 330 in place within the detection cavity 102. In FIGS. 12 and 13 fins 348 outwardly project in a direction which angles toward second side 336. This configuration reduces the friction encountered upon insertion in the write protect detection cavity 102, but still effectively resists movement in the opposite removal direction.

FIGS. 14 and 15 are side and perspective views respectively of a fifth embodiment of the write enabling device designated as 430. In this embodiment plug 432 has a slot 450 which is parallel to one of the faces 438. Slot 450 penetrates second side 436 but does not penetrate first side 434 thereby partitioning plug 432 into a major portion 452 resiliently connected to a minor portion 454. When minor portion 454 is moved in direction 456, it is resiliently urged in a direction opposite to direction 456. Therefore, when plug 432 is inserted into the detection cavity 102 (refer to FIG. 4) major portion 452 and minor portion 454 are compressed toward one another and resiliently cooperate to exert outward force on the walls 104 of the detection cavity 102 and thereby retain plug 432 in place. In the installed configurations friction enhancing ridges 446 serve to exert additional pressure upon walls 104 (refer to FIG. 4) of the detection cavity 102, and thereby the write enabling device 430 is more securely retained in place. A plurality of parallel ridges 499 facilitate the movement of minor portion 454 by providing a surface which can be engaged by a fingernail.

FIGS. 16 through 19 show top ecovered, top uncovered, side, and perspective views respectively of a sixth embodiment of the write enabling device designated as 530. A first planar member 556 has a first side 558 and a second opposite side 560, and an aperture 562 which has a size less than opening 105 in write protect detection cavity 102 of the tape cassette 100 (refer to FIG. 4). Frame 564 is integral with and extends outwardly from second side 560 of first planar member 556 and surrounds aperture 562. Frame 564 has four sides 566 each having an outer face 538. Sides 566 each have a second depth 540 which is substantially equal to the first depth 106 of the write protect detection cavity 102 (refer to FIG. 4). Frame 564 is sized to fit into and be snugly accepted by the detection cavity 102. A second planar member 568 overlays and is rotatably connected by a pivoting means to first side 558 of first planar member 556 so that second planar member 568 may be selectively rotated to cover or uncover aperture 562 and thereby enable or disable the writing feature of the player/recorder. In the embodiment shown, the pivoting means includes holes 570 in both first planar member 556 and second planar member 568 which engage and rotate around a cylindrical pin 572. In the installed configuration, friction enhancing ridges 546 serve to exert additional pressure upon walls 104 (refer to FIG. 4) of the detection cavity 102, and thereby the write enabling device 530 is more securely retained in place. A plurality of parallel ridges 599 facilitate the movement of second planar member 568 by providing a surface which can be engaged by a fingernail.

FIGS. 20 and 21 are perspective views of the sixth embodiment in the covered and uncovered positions respectively.

Write enabling device 530 is used to selectively enable or disable the write feature by first inserting square frame 564 into write protect detection cavity 102 (refer to FIG. 4). The write feature of the player/recorder is then enabled by rotating second planar member 568 so as to cover aperture 562 (hidden) as is depicted in FIG. 20. Conversely, the write feature is disabled by rotating second planar member 568 in direction 571 so as to uncover aperture 562 as is depicted in FIG. 21.

Figure 22:
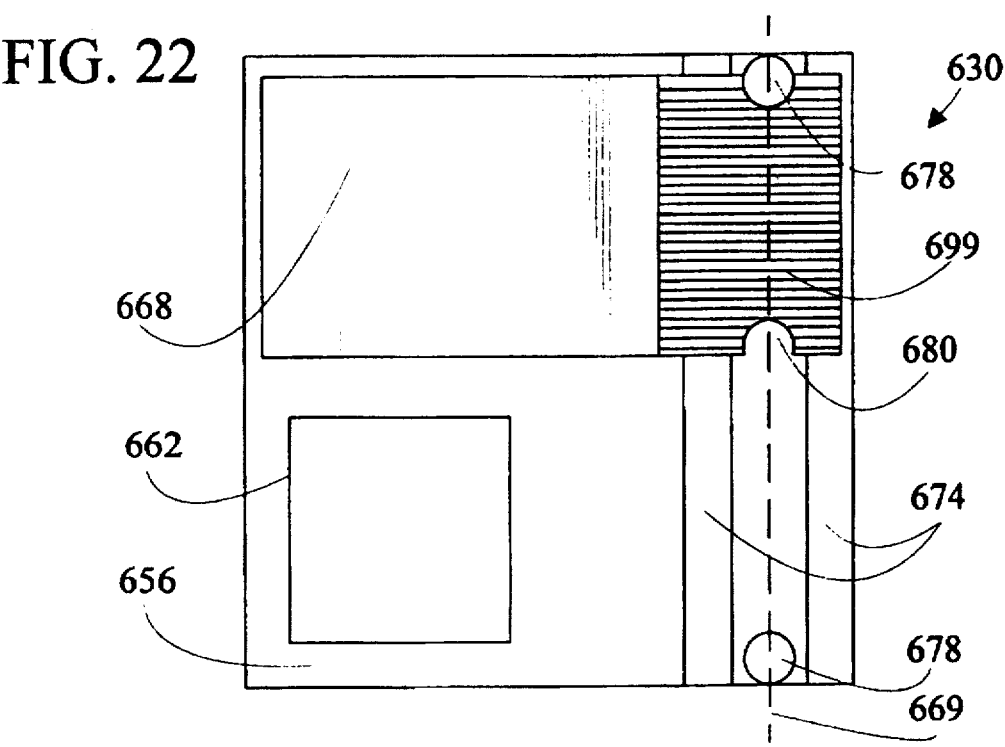
FIG. 22 is a top view of a seventh embodiment in the uncovered position.
Figure 23:
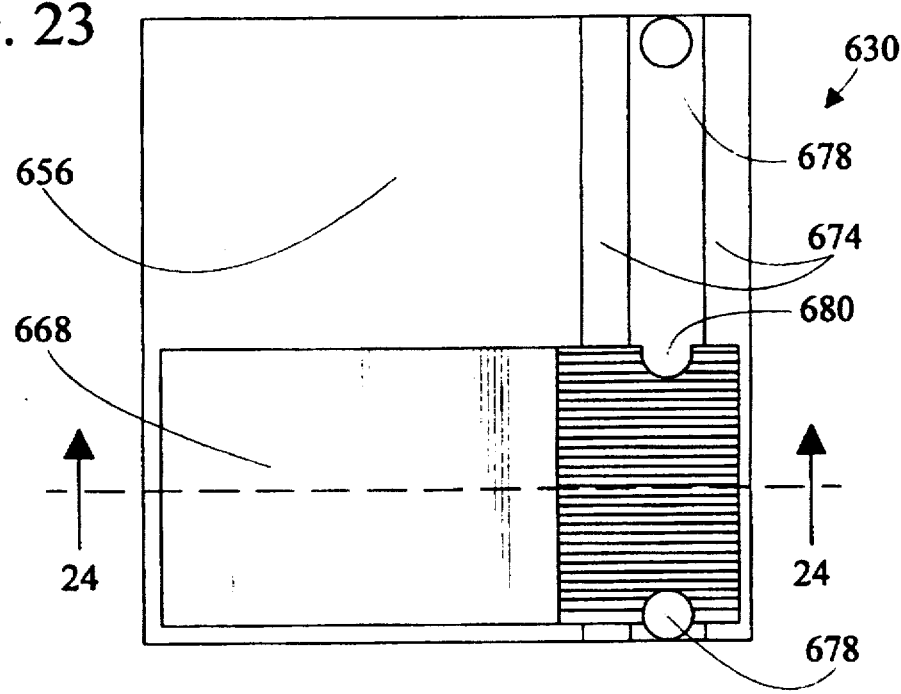
FIG. 23 is a top view of the seventh embodiment in the covered position.
Figure 24:
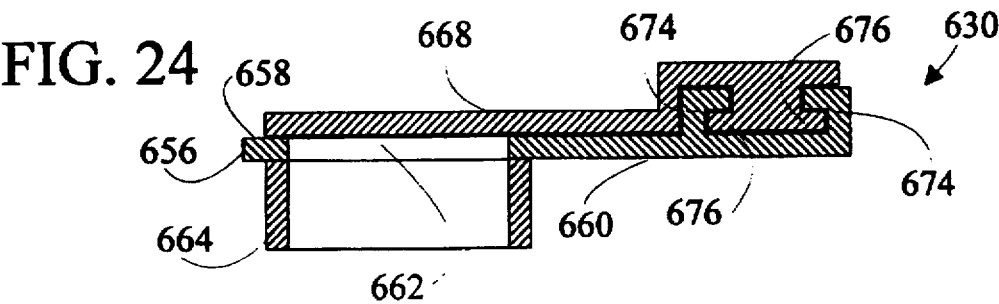
FIG. 24 is a cross section view along the line 24—24 of FIG. 23.

FIGS. 22, 23, and 24 show top uncovered, top covered, and cross section views respectively of a seventh embodiment designated as 630. A planar member 656 has first side 658 and an opposite second side 660, and an aperture 662 which has a size less than opening 105 of write protect detection cavity 102 of the tape cassette 100 (refer to FIG. 4). As was the case for the sixth embodiment (refer to FIG. 19 and the discussion pertaining thereto), this embodiment also has a square frame 664 assembly which is integral with and extends outwardly from second side 660 of planar member 656 and surrounds aperture 662. A sliding means slidably connects planar member 656 to a cover member 668. In the embodiment shown, the sliding means comprises a pair of parallel longitudinal runners 674 disposed on first side 658 of planar member 656 and are longitudinally oriented along an axis 669 which does not intersect aperture 662. Cover member 668 has parallel longitudinal rails 676 that are sized to be accepted by runners 674. Rails 676 slidably engage runners 674 so that cover member 668 may be selectively slid so as to uncover aperture 662 (write disable) as is shown in FIG. 22, or so as to cover aperture 662 (write enable) as is shown in FIG. 23. In an alternative embodiment, runners 674 are disposed on cover member 668, and rails 676 are disposed on planar member 656. First and second locking means are provided to lock cover member 668 in the covered and uncovered positions respectively. In the shown embodiment, the first and second locking means comprise cylindrically-shaped tabs 678 disposed on planar member 656 which engage cooperating cylindrically-shaped captive cavities 680 located on cover member 668. Captive cavities 680 form more than a semicircle, and therefore when tabs 678 are pressed into the cavities 680, the cavities 680 capture the tabs 678. A plurality of parallel ridges 699 facilitate the movement of cover member 668 by providing a surface which can be engaged by a fingernail.

Write enabling device 630 is used to selectively enable or disable the write feature by first inserting square frame 664 into write protect detection cavity 102 (refer to FIG. 4). The write feature of the player/recorder is then enabled by sliding cover member 668 so as to cover aperture 662 as is depicted in FIG. 23. Conversely, the write feature is disabled by sliding cover member 668 so as to uncover aperture 662 as is depicted in FIG. 22.

Figure 25:
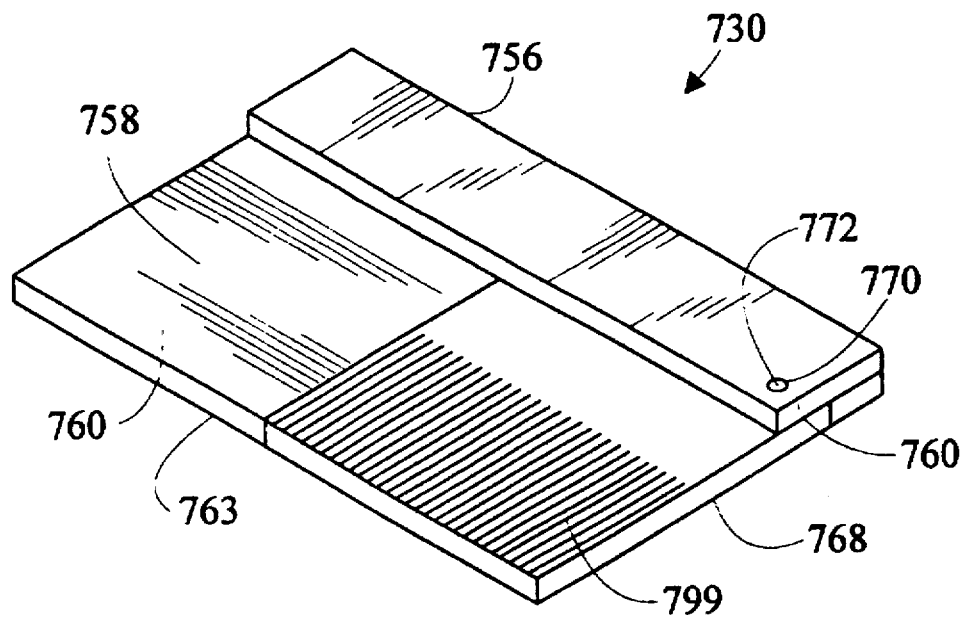
FIG. 25 is a perspective view of an eighth embodiment shown in the covered or write enabled position.
Figure 26:
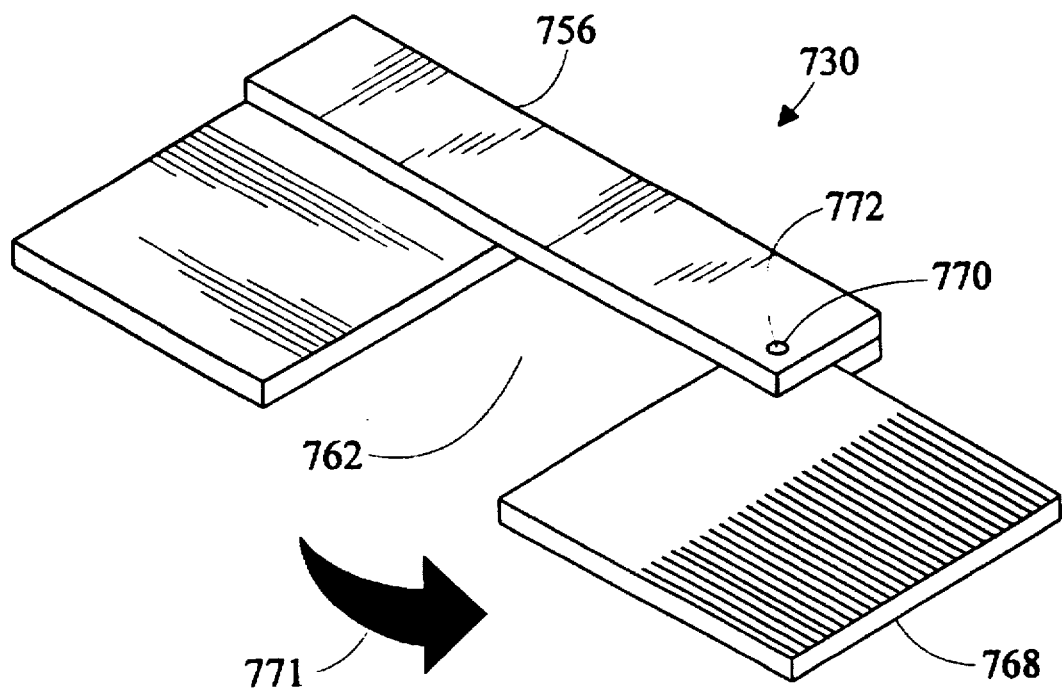
FIG. 26 is a perspective view of an eighth embodiment shown in the open or write disabled position.

FIGS. 25 and 26 are perspective views of an eighth embodiment of the write enabling device, designated as 730. An attachment member 756 has a first side 758 and a second opposite side 760, and an open space 762 which is substantially the same size as opening 105 in write protect detection cavity 102 of the tape cassette 100 (refer to FIG. 4). Adhesive 763 is disposed upon second side 760, so that attachment member 756 may be fixedly attached to the tape cassette 100 (refer to FIG. 4) with open space 762 aligned with opening 105 in write protect detection cavity 102. A cover member 768 is rotatably connected by a pivoting means to second side 760 of attachment member 756 so that cover member 768 may be selectively rotated to cover or uncover open space 762 and thereby enable or disable the writing feature of the player/recorder. In the embodiment shown, the pivoting means includes holes 770 in both attachment member 756 and cover member 768 which engage and rotate around a cylindrical pin 772. A plurality of parallel ridges 799 facilitate the movement of cover member 768 by providing a surface which can be engaged by a fingernail.

Write enabling device 730 is used to selectively enable or disable the write feature by first adhesively attaching attachment member 756 to tape cassette 100 so that open space 762 is aligned with write protect detection cavity 102. The write feature of the player/recorder is then enabled by rotating cover member 768 so as to cover open space 762 as is depicted in FIG. 25. Conversely, the write feature is disabled by rotating cover member 768 in direction 771 so as to uncover open space 762 as is depicted in FIG. 26.

FIG. 27 is a perspective view of the underside of the attachment member 756 of the eighth embodiment 730 showing a portion of a latching means. In the embodiment shown the latching means consists in part of a plurality of substantially hemispherical protrusions 788 disposed on second side 760 of attachment member 756. FIG. 29 is an enlarged fragmented perspective view of the area 29 of FIG. 27 showing protrusions 788. FIG. 28 is a perspective view of the cover member 768 of the eighth embodiment 730 showing the other portion of the latching means which comprises a plurality of substantially hemispherical depressions 790 disposed on cover member 768. FIG. 30 is an enlarged fragmented perspective view of the area 30 of FIG. 28 showing depressions 790. When attachment member 756 and cover member 768 are joined, protrusions 788 selectively engage depressions 790 in one of two perpendicular orientations so that cover member 768 is retained in either a covered or uncovered position. It can readily be appreciated that the location of protrusions 788 and depressions 790 could be reversed wherein protrusions 788 are disposed on cover member 768 and depressions 790 are disposed on attachment member 756.

FIG. 31 is a perspective view of the underside of the attachment member 756 of the eighth embodiment showing a portion of an alternate latching means. In the embodiment shown the latching means consists in part of a plurality of longitudinal grooves 790 disposed on second side 760 of attachment member 756. FIG. 33 is an enlarged fragmented perspective view of the area 33 of FIG. 31 showing longitudinal grooves 788. FIG. 32 is a perspective view of the cover member 768 of the eighth embodiment 730 showing the other portion of the latching means which comprises a plurality of longitudinal ridges 794 disposed on cover member 768. FIG. 34 is an enlarged fragmented perspective view of the area 34 of FIG. 32 showing longitudinal ridges 794. When attachment member 756 and cover member 768 are joined, grooves 792 selectively engage longitudinal ridges 794 in one of two perpendicular orientations so that cover member 768 is retained in either a covered or uncovered position. It can readily be appreciated that the location of grooves 792 and longitudinal ridges 794 could be reversed wherein grooves 792 are disposed on cover member 768 and longitudinal ridges 794 are disposed on attachment member 756.

It is further noted that the bevels 31 of the first embodiment (refer to FIGS. 1–4), the friction enhancing ridges 146 of the second embodiment (refer to FIG. 7), the convex faces 238 of the third embodiment (refer to FIGS. 8, 9), and the longitudinal fins 348 of the fourth embodiment (refer to FIGS. 10–13) may be combined to form numerous variations that, for the sake of simplicity, have not been specifically shown in the figures.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A write enabling device, for use with a tape cassette having a write protect detection cavity formed by four walls having a first depth and a floor substantially perpendicular to the walls and an opening, comprising;

a first planar member having a first side and a second side opposite to said first side;

said first planar member having an aperture having a size less than the opening of the detection cavity, a frame integral with and extending outward from said second side of said first planar member, said frame surrounding said aperture, said frame having four sides each having an outer face, each side having a second depth substantially equal to said first depth, said frame sized so is snugly accepted by the detection cavity;

a second planar member; and, a pivoting means rotatably connecting said first side of said first planar member to said second planar member so that said second planar member is selectively rotatable to cover or uncover said aperture;

said pivoting means wherein said first and second planar members having holes which engage a cylindrical pin.

2. A write enabling device according to claim 1, further including a plurality of friction enhancing ridges integral with at least one said outer face.

3. A write enabling device according to claim 1, wherein said four outer faces are convex.

4. A write enabling device, for use with a tape cassette having a write protect detection cavity formed by four walls having a first depth and a floor substantially perpendicular to the walls and having an opening, comprising:

a planar member having a first side and a second side opposite of said first side;

said planar member having an aperture having a size less than the opening of the detection cavity, a frame integral with and extending outward from said second side of said planar member, said frame surrounding said aperture, said frame having four sides each having an outer face, each side having a second depth substantially equal to said first depth, said frame sized so is snugly accepted by the detection cavity;

a cover member; and, a sliding means slidably connecting said planar member to said cover member, said sliding means further including a pair of parallel longitudinal runners disposed on said first side of said planar member, said runners oriented along an axis which does not intersect said aperture;

said cover member having parallel longitudinal rails sized so is accepted by said longitudinal runners; and, said longitudinal rails engaging said longitudinal runners so that said cover member is selectively slidable to cover or uncover said aperture, a first locking means for locking said cover member so as to cover said aperture, and a second locking means for locking said cover member so as to uncover said aperture, said first and second locking means comprising a cylindrically-shaped tab engaging a cooperating cylindrically-shaped captive cavity.

5. A write enabling device according to claim 4, further including a plurality of friction enhancing ridges integral with at least one said outer face.

6. A write enabling device according to claim 4, wherein said four outer faces are convex.

* * * * *